United States Patent
Moyes et al.

(10) Patent No.: US 10,169,208 B1
(45) Date of Patent: Jan. 1, 2019

(54) SIMILARITY SCORING OF PROGRAMS

(71) Applicants: Charles W Moyes, San Mateo, CA (US); Anthony B Diepenbrock, IV, San Mateo, CA (US)

(72) Inventors: Charles W Moyes, San Mateo, CA (US); Anthony B Diepenbrock, IV, San Mateo, CA (US)

( * ) Notice: Subject to any disclaimer, the term of this patent is extended or adjusted under 35 U.S.C. 154(b) by 0 days.

(21) Appl. No.: 14/930,375

(22) Filed: Nov. 2, 2015

Related U.S. Application Data

(60) Provisional application No. 62/074,477, filed on Nov. 3, 2014.

(51) Int. Cl.
| | | |
|---|---|---|
| *G06F 9/44* | (2006.01) | |
| *G06F 11/36* | (2006.01) | |
| *G06F 8/41* | (2018.01) | |
| *G06F 17/30* | (2006.01) | |

(52) U.S. Cl.
CPC ............ *G06F 11/3668* (2013.01); *G06F 8/43* (2013.01); *G06F 17/3069* (2013.01); *G06F 17/30628* (2013.01)

(58) Field of Classification Search
CPC .................................................. G06F 11/3668
USPC ........................................................ 717/124
See application file for complete search history.

(56) References Cited

U.S. PATENT DOCUMENTS

| | | | | |
|---|---|---|---|---|
| 8,250,464 | B2 * | 8/2012 | Dang ................... | G06F 17/272 715/234 |
| 8,443,354 | B1 * | 5/2013 | Satish ...................... | G06F 8/65 717/104 |
| 2004/0006563 | A1 * | 1/2004 | Zwiegincew ..... | G06F 17/30415 |
| 2010/0114871 | A1 * | 5/2010 | Cheong ............... | G06F 17/3053 707/719 |
| 2013/0254746 | A1 * | 9/2013 | Balakrishnan ...... | G06F 11/3608 717/124 |

OTHER PUBLICATIONS

An Algorithm for the Principal Component Analysis of Large Data Sets, Halko, Nathan. Jul. 5, 2010.
Five Balltree Construction Algorithms, Stephen M. Omohundro, International Computer Science Institute, Nov. 20, 1989.
"Locality Sensitive Hashing" at https://en.wikipedia.org/wiki/Locality-sensitive_hashing, Feb. 6, 2018
https://www.youtube.com/watch?v=tvua7A0rVWM (see non-patent literature) Aug. 12, 2013.

\* cited by examiner

*Primary Examiner* — Evral E Bodden

(57) ABSTRACT

A technique is provided for determining a similarity score between a source program and a test program. The technique includes generating an abstract syntax tree for both programs and converting the subtrees of each syntax tree into hash vectors. Vectors in the abstract syntax tree for the source program are dimension reduced and made accessible in a spatial data structure such as an R-tree. The structure is searched using the hash vectors from the test program abstract syntax tree and candidate matching vectors are found. A search is conducted among the candidate matching vectors for pairs that have a degree of similarity above a given threshold and these are the reported results.

20 Claims, 6 Drawing Sheets

```
rule program =                200
    seqblock
        var x
        var y
        while (y-5)
            var y
            x := input()
            y := input()
            x := 2 * (3+y)
        print 5
    endseqblock
```

SIMILARITY SCORING OF PROGRAMS

CROSS REFERENCE TO RELATED APPLICATION

This application incorporates by reference in its entirety and claims priority to U.S. Provisional Application 62/074,477, filed on Nov. 3, 2014, and titled "SIMILARITY SCORING OF PROGRAMS".

FIELD OF THE INVENTION

The present invention relates to identifying similar fragments of code between a set of source programs and a test program to determine whether the test program matches parts of the source programs in the set.

BACKGROUND

Often is suspected that a particular program is very similar to an existing program. In a large program, it is difficult to review the entire program and determine how similar the two programs are. Furthermore, even if the two programs appear to be similar, it is difficult to come up with an objective measure of the similarity, such that above a certain level, one can say that there is too much similarity and that the particular program is a substantial copy of the existing program.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

One embodiment is a method of generating a similarity score between a source program and a test program. The method includes generating a source abstract syntax tree (sAST) of a source program and a test AST (tAST) for a test program; generating hash vectors for each AST by hashing subtrees of the sAST and tAST; reducing the dimensionality hash vectors of the sAST; forming a spatial data structure based on the reduced dimensionality hash vectors; querying the spatial data structure with the hash vectors of the tAST to find candidate matching vectors; searching among the candidate matching vectors for pairs of vectors that exceed a similarity threshold; and reporting the pairs that exceed the similarity threshold.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method is described for finding a similarity score between a source program and a test program. The method determines an Abstract Syntax Tree (AST) for both programs. For the source text AST, a spatial data structure is constructed using a representation of the sub-trees comprising the source AST. This spatial data structure is then searched with representations of the test text for candidate matches. For each candidate match, the ASTs are consulted to determine if the candidate match is an actual match that should be recorded. If all of the candidate matches up to the root of the source text program AST are actual matches, then a report conveys that the test text is a close copy of the source text. Otherwise, the last sub-tree in the source AST that matches is returned.

DESCRIPTION

Figure 1:
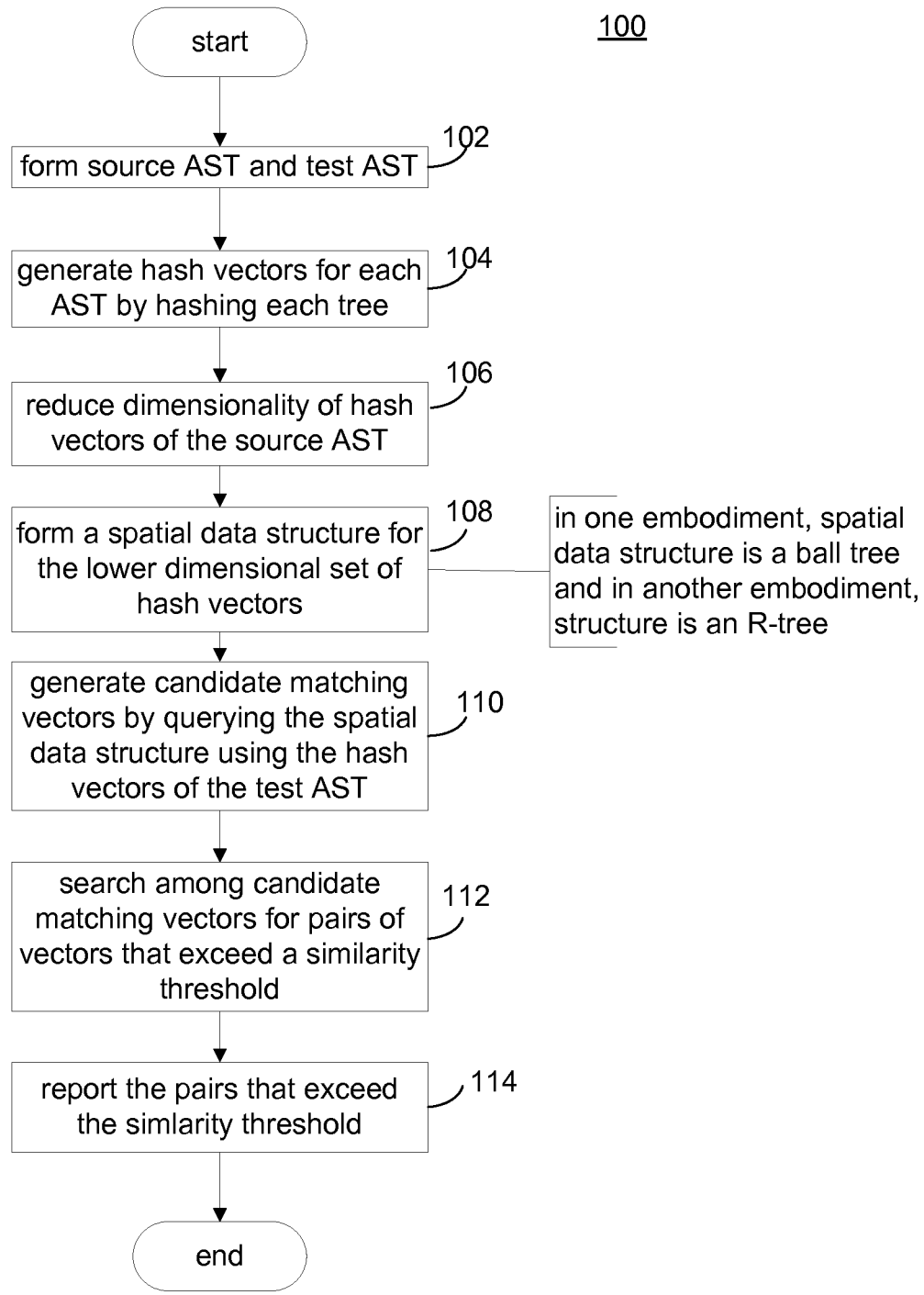
FIG. 1 depicts steps of the algorithm according to one embodiment.

FIG. 1 depicts the overall flow of an embodiment of the algorithm. In step 102, ASTs for the source code and for the test code are formed. In step 104, hash vectors for each AST are generated by hashing each subtree of each AST. Next, in step 106, the dimensionality of the hash vectors for the source AST is reduced. In step 108, a spatial data structure is formed for accessing the reduced dimension hash vectors. In step 110, the spatial data structure is queried using the hash vectors of the test AST to find candidate matching vectors. In step 112, a search is conducted among matching vectors for pair of vectors that exceed a similarity threshold. In step 114, the pairs that exceed the threshold are reported.

Forming the AST for Source Program and Test Program

Figures 2A, 2B:
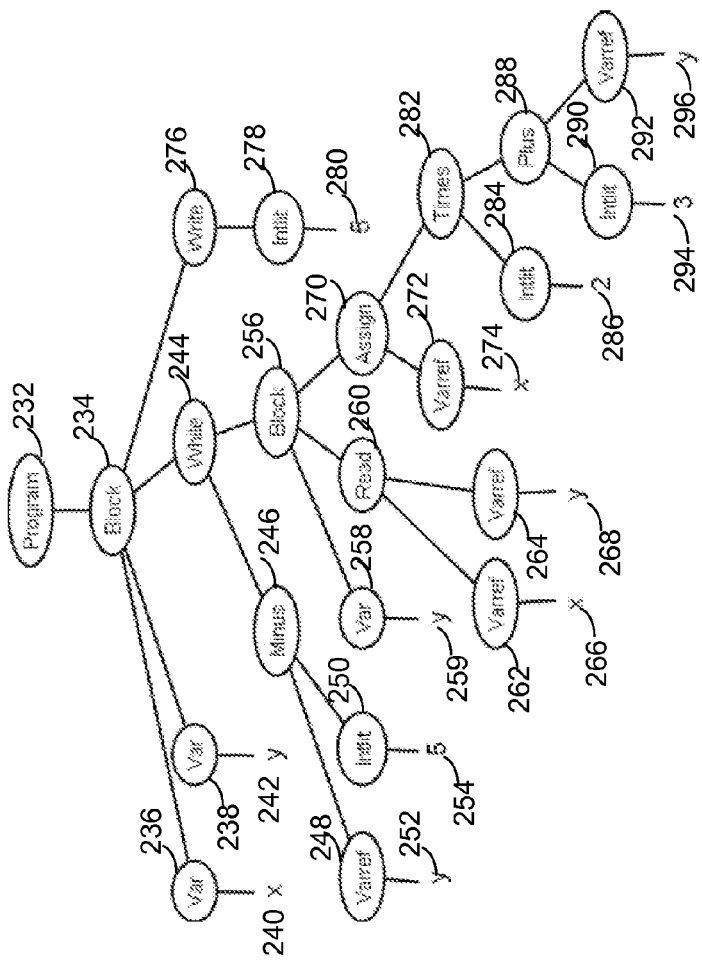
FIG. 2B depicts an example abstract syntax tree (AST) for a sample source text program in FIG. 2A.

Given a source file, an embodiment parses and lexes an Abstract Syntax Tree (AST) using a BNF grammar. The source file line and column information is preserved in the tree as metadata. Similarly, an AST is formed for the test program. FIG. 2A depicts a small code section and FIG. 2B depicts an AST that represents the code section in FIG. 2A. In FIG. 2B, node 232 represents the program, node 234 represents the sequence block, node 236, and 238 represent the declarations of variable x and variable y. Node 244 represent the while loop and node 276 represents the print 5 statement. Node 244 is broken down into the y–5 test in the while loop and is represented by nodes 246, 248, 250. Node 256 represents the block of code in the while loop. including the declaration of variable y in node 258, the reading of variable x in node 262, the reading of variable y, in node 264, the assignment to variable x in node 270, the addition of the literal with y in node 288, the multiplication of the literal 2 and the sum (3+y) and the assignment of the result to variable x in node 270.

Hashing

The sub-trees in the Abstract Syntax Tree are then hashed from the bottom up starting from the leaves into an $O(N^2+N)$ high-dimensional space, based on the tree structure. The hash function is intentionally chosen to be "poor" in the sense that similar sub-trees are hashed into nearly the same bins. The hashing operation returns a hash vector containing bins for each node and each possible edge, each bin containing the hash value of the node or edge. In one embodiment, a depth-first bottom-up traversal of the tree is made, bins are added and the hash vector at each level is passed along upward until the root of the tree is reached. If the tree is deep and complex, the hash vector for the tree has many bins. This means that the hash vector has high dimensionality.

An example hash vector for an AST sub-tree having nodes, Load, Call, Name, and undirected edges joining Load to Name, and Call to Name, is

```
{'nodes': {'Load': 1, 'Call': 1, 'Name': 1}, 'undirected_edges':
{'Load_Name': 1, 'Call_Name': 1}}
```

Filter Reducing

Figure 3:
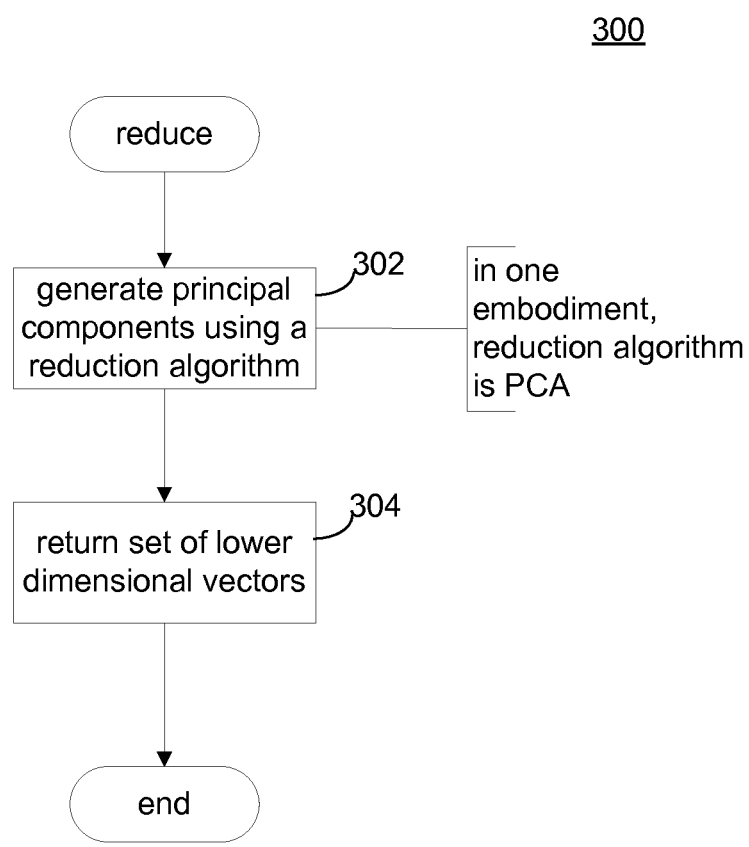
FIG. 3 depicts steps for reducing the dimensionality of the hash vectors.

The hash vectors are filtered and their dimensionality is reduced by means of a selectable orthogonal linear transformation, which causes the coordinates to represent data in order of diminishing variance. This is depicted in step 302 of FIG. 3. In one embodiment, the selected transformation is PCA (Principal Component Analysis) and the number of principal components is reduced down to three. A canonical matrix SVD divided by the covariance matrix in which all but k<m eigenvectors are discarded leaving only the principal components, is preferred. The set of lower dimensional vectors is returned as depicted in step 304 of FIG. 3

Filter reducing places a threshold on the minimum sub-tree size so that small and thus common fragments of code, such as a single function call, do not create a large number of matches.

Forming a Spatial Data Structure

As depicted in step 108 of FIG. 1, a spatial data structure is formed and the reduced dimensionality hash vectors are then stored in the spatial data structure over a normalized distance metric, such as a Mahalanobis or a Euclidean metric. The spatial data structure enables fast nearest neighbor searching in high-dimensional spaces because points near each in the data set are arranged in the same spatial component of the spatial data structure. In one embodiment, the spatial data structure is a ball-tree. In another embodiment, the spatial data structure is an R-tree index.

Hashing the Test AST

As depicted in step 102 of FIG. 1, the subtrees of the AST for the test code are also converted into hash vectors and the vectors and bins are retained from the hashing.

Finding Candidate Matches

As depicted in step 110 of FIG. 1, the hashed sub-trees of the AST for the test text are then used to query the spatial data structure. In one embodiment, a nearest neighbor algorithm, such as k-NN, is used for the query. Candidate matching vectors within a specified distance threshold are thus found and returned by the query. In another embodiment, a search is conducted for neighbors within a finite bounded hyper-sphere or hyper-cube with a given radius r or side length d, respectively. In the embodiment with the hyper-cube, a preferred value of d is 1.0.

The reduction in dimensionality described above improves the spatial data structure look-up time.

Generating Pairs

Figure 4:
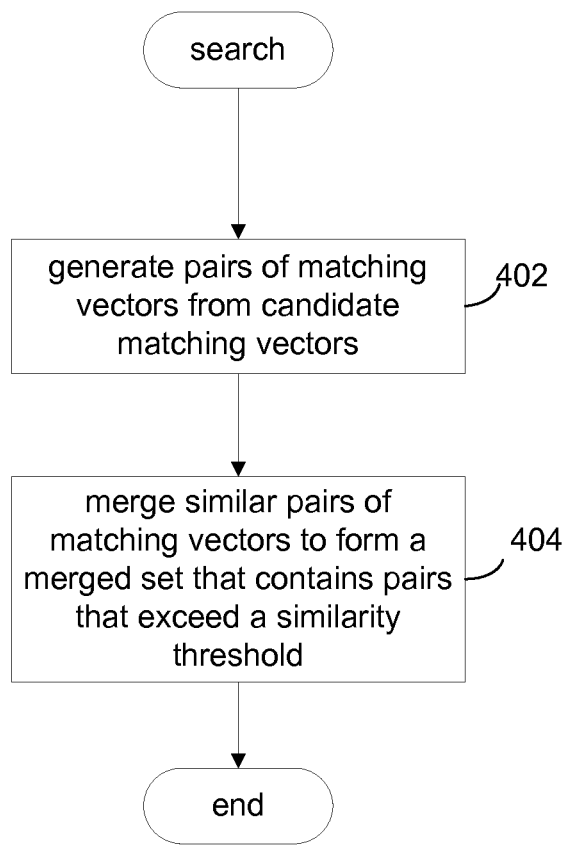
FIG. 4 depicts steps for searching among candidate matching vectors for pairs of vectors that exceed a similarity threshold.

FIG. 4 depicts the step for searching for matching pairs. Using the candidate matching vectors, the reduced hash vectors for the source AST, and the hash vectors for the test AST as input, pairs of matches are found, in step 402, in accordance with a scoring formula. In one embodiment, the scoring formula is $2*S/(2*S+D)$, where S is the number of matching bins in the hash vectors and D is the number of non-matching bins. In one embodiment, the matches have the format of the tuple, (similarity, hash1, linenos1, hash2, linenos2), where similarity is the value S above, hash1 is the hash vector of the first code fragment/AST node and hash2 is the hash vector of the second fragment/AST node. The linenos1 and linenos2 values are the sets of line numbers from the original source files of the matching code fragments that are represented in the vectors. By convention, linenos1 is the set of line numbers from the test file, and linenos2 is the set of line numbers from the source file.

Merged Set

In step 404 of FIG. 4, the matches are then sorted and converted into a sorted list. Step 404 is depicted in more detail in FIG. 5.

Figure 5:
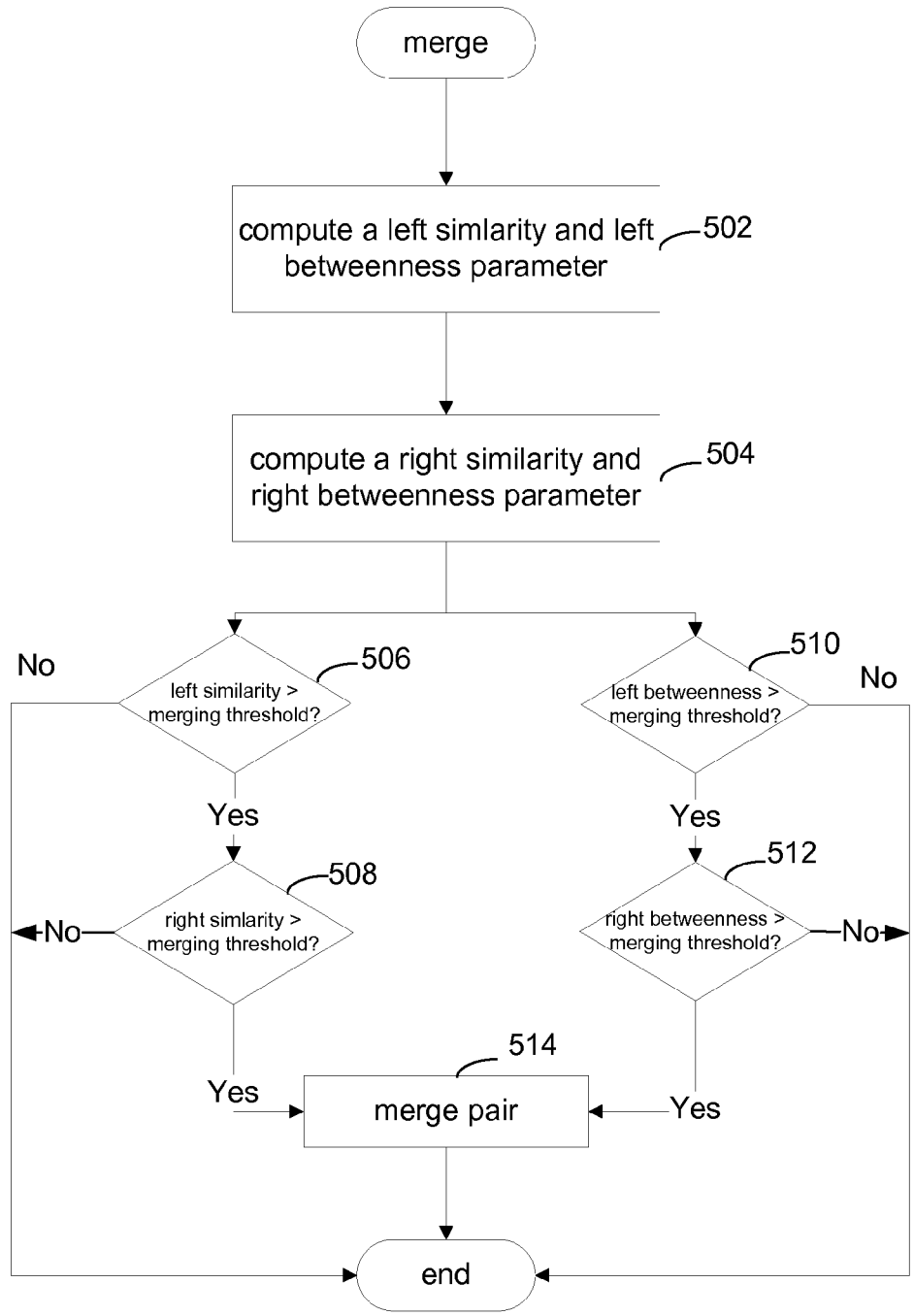
FIG. 5 depicts steps for merging similar pairs of matching vectors to form a merged set that contains pairs that exceed a similarity threshold.

In FIG. 5, each possible pair of matches is examined and a score, mc, is computed based on a left factor and a right factor, corresponding to the left and right parts of the pair. The left factor determines the left_similarity and left_betweenness values. The right factor determines the right_similarity and right_betweenness values. A left or right similarity value is computed by computing a common value and a difference value and combining them.

```
left_common = len(set(left_linenos1) and set(left_linenos2))
left_diff = len(set(left_linenos1) xor (set(left_linenos2))
right_common = len(set(right_linenos1) and set(right_linenos2))
right_diff = len(set(right_linenos1) xor (set(right_linenos2))
```

In one embodiment, the left similarity value is found according to the following:

left_similarity=float(2*left_common)/float
    (2*left_common+left_diff)

and the right similarity value is found according to the following:

right_similarity=float(2*right_common)/float
    (2*right_common+right_diff)

The left betweenness value is found according to the following:

left_betweenness=max(left_common/float(len(set
    (left_linenos1))),left_common/float(len(set
    (left_linenos2))))

and the right betweenness value is found according to the following:

right_betweenness=max(right_common/float(len(set
    (right_linenos1))),right_common/float(len(set
    (right_linenos2))))

The left factor returns the left_similarity and left_betweenness values in step 502 of FIG. 5 and the right factor returns the right_similarity and right_betweenness values in step 504 of FIG. 5. These values are then used to compute a merge criteria based on a merging threshold. In one embodiment, steps 506, 508, 510, and 512 carry out the computation of the criterion for merging the pairs of matches. Those steps implement the following equation.

```
mc := (left_similarity >= MERGING_THRESHOLD and
right_simlarity >= MERGING_THRESHOLD) or
(left_betweennes >= MERGING_THRESHOLD and
right_betweenness >= MERGING_THRESHOLD))
```

In one embodiment, the merging threshold is 0.8.

The set of merged pairs then gives items in the source and test program that are deemed sufficiently similar to report, in step 114 of FIG. 1

Alternative Embodiment

After querying the spatial data structure with the hash vectors of the test AST to find candidate matching vectors, similarity in another embodiment is found by a tree-matching algorithm. In particular, a dynamic programming tree-matching algorithm is employed to compare the actual source and test code. The tree-matching algorithm operates in a manner similar to fuzzy string searching. As the tree-matching algorithm proceeds up the source AST tree, a similarity state within a finite state machine is triggered if a comparison score exceeds a given threshold. If the traversal proceeds all the up to the root of the source AST then, then a state of "similar" is recorded between the source code and the test code. If the traversal proceeds up the tree until it encounters a large drop off in the similarity score, then the last sub-tree node that was encountered before the drop off is reported and the traversal stops.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
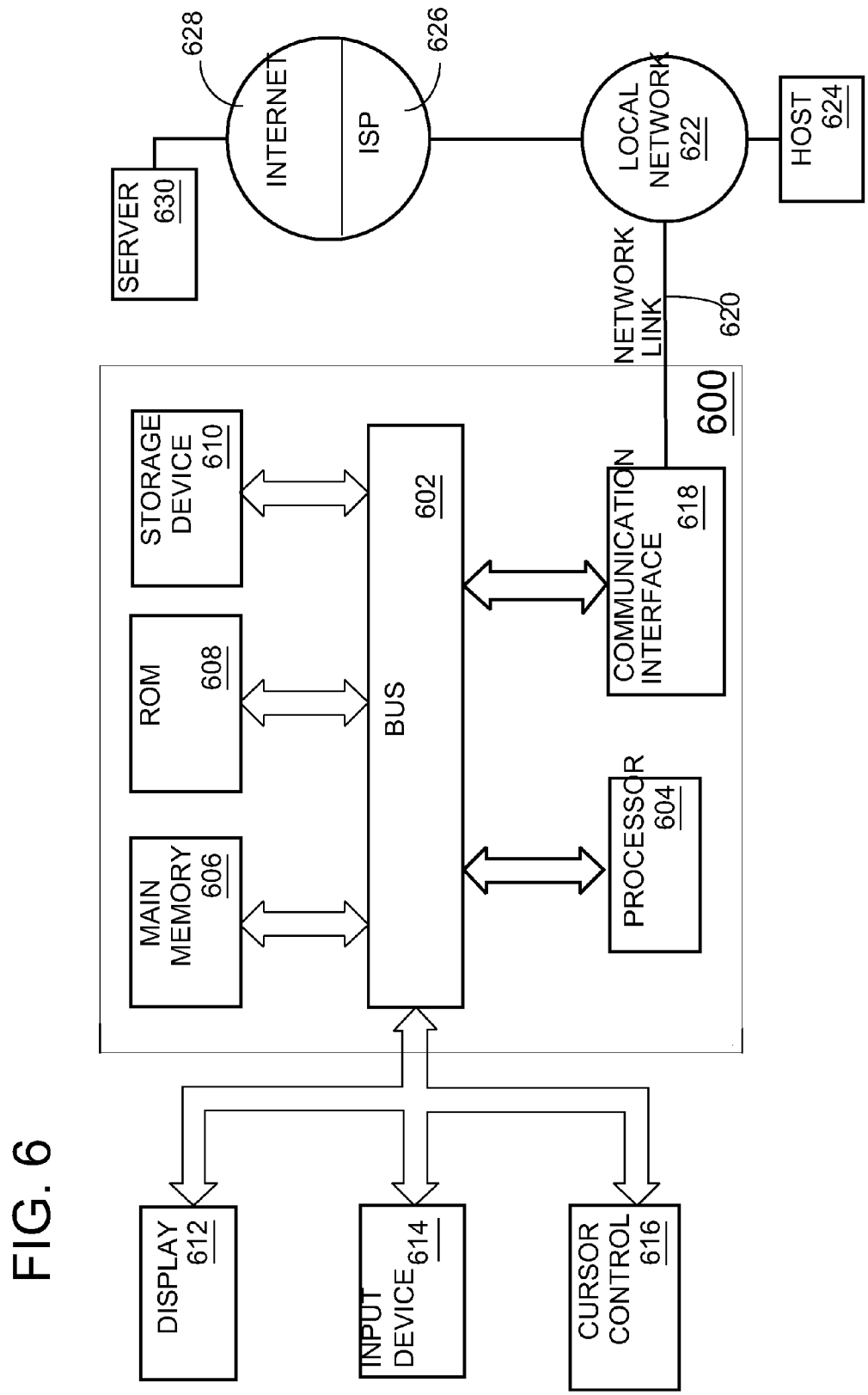
FIG. 6 depicts a representative computer system on which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for generating a similarity score between a source program and a test program, the method comprising:
   generating a source abstract syntax tree (sAST) for a source program and a test abstract syntax tree (tAST) for a test program;
   generating hash vectors for each abstract syntax tree (AST) by hashing subtrees of the sAST and tAST;
   reducing the dimensionality hash vectors of the sAST;
   forming a spatial data structure based on the reduced dimensionality hash vectors;
   querying the spatial data structure with the hash vectors of the tAST to find candidate matching vectors;
   searching among the candidate matching vectors for pairs of vectors that exceed a similarity threshold; and
   reporting the pairs that exceed the similarity threshold.

2. The method of claim 1, wherein the spatial data structure is an R-tree.

3. The method of claim 1, wherein the spatial data structure is a ball tree.

4. The method of claim 1, wherein searching among the candidate matching vectors for pairs of vectors that exceed a similarity threshold includes:
   generating pairs of matching vectors from the candidate matching vectors; and
   merging similar pairs of matching vectors to form a merged set that contains pairs that exceed the similarity threshold.

5. The method of claim 4, wherein merging similar pairs of matching vectors includes:
   comparing a left similarity factor and right similarity factor against a threshold; and
   comparing a left betweenness factor and a right betweenness factor against the threshold.

6. The method of claim 5, wherein the left similarity factor is based on a left common value and a left difference value.

7. The method of claim 5, wherein the right similarity factor is based on a right common value and a right difference value.

8. The method of claim 5, wherein the left betweenness factor is based on a left common value and a size of a set of left line numbers.

9. The method of claim 5, wherein the right betweenness factor is based on a right common value and a size of a set of right line numbers.

10. The method of claim 1, wherein searching among the candidate matching vectors for pairs of vectors that exceed a similarity threshold includes:
    comparing the source AST tree with the test AST by traversing the source AST from a leaf of the tree and computing a comparison score at each level of the tree; and
    reporting a pair of vectors as being similar if the comparison score exceeds a threshold when traversal reaches the root of the source AST.

11. A non-transitory computer-readable storage medium comprising instructions that, when executed in a computing device, enable a method for generating a similarity score between a source program and a test program, by performing the steps of:
    generating a source abstract syntax tree (sAST) for a source program and a test abstract syntax tree (tAST) for a test program;
    generating hash vectors for each abstract syntax tree (AST) by hashing subtrees of the sAST and tAST;
    reducing the dimensionality hash vectors of the sAST;
    forming a spatial data structure based on the reduced dimensionality hash vectors;
    querying the spatial data structure with the hash vectors of the tAST to find candidate matching vectors;
    searching among the candidate matching vectors for pairs of vectors that exceed a similarity threshold; and
    reporting the pairs that exceed the similarity threshold.

12. The non-transitory computer-readable storage medium of claim 11, wherein the spatial data structure is an R-tree.

13. The non-transitory computer-readable storage medium of claim 11, wherein the spatial data structure is a ball tree.

14. The non-transitory computer-readable storage medium of claim 11, wherein searching among the candidate matching vectors for pairs of vectors that exceed a similarity threshold includes instructions that when executed perform the steps of:
generating pairs of matching vectors from the candidate matching vectors; and
merging similar pairs of matching vectors to form a merged set that contains pairs that exceed the similarity threshold.

15. The non-transitory computer-readable storage medium of claim 14, wherein merging similar pairs of matching vectors includes instructions that when executed perform the steps of:
comparing a left similarity factor and right similarity factor against a threshold; and
comparing a left betweenness factor and a right betweenness factor against the threshold.

16. The non-transitory computer-readable storage medium of claim 15, wherein the left similarity factor is based on a left common value and a left difference value.

17. The non-transitory computer-readable storage medium of claim 15, wherein the right similarity factor is based on a right common value and a right difference value.

18. The non-transitory computer-readable storage medium of claim 15, wherein the left betweenness factor is based on a left common value and a size of a set of left line numbers.

19. The non-transitory computer-readable storage medium of claim 15, wherein the right betweenness factor is based on a right common value and a size of a set of right line numbers.

20. The non-transitory computer-readable storage medium of claim 11, wherein searching among the candidate matching vectors for pairs of vectors that exceed a similarity threshold includes instructions that when executed perform the steps of:
comparing the source AST tree with the test AST by traversing the source AST from a leaf of the tree and computing a comparison score at each level of the tree; and
reporting a pair of vectors as being similar if the comparison score exceeds a threshold when traversal reaches the root of the source AST.

* * * * *